Figure 1:
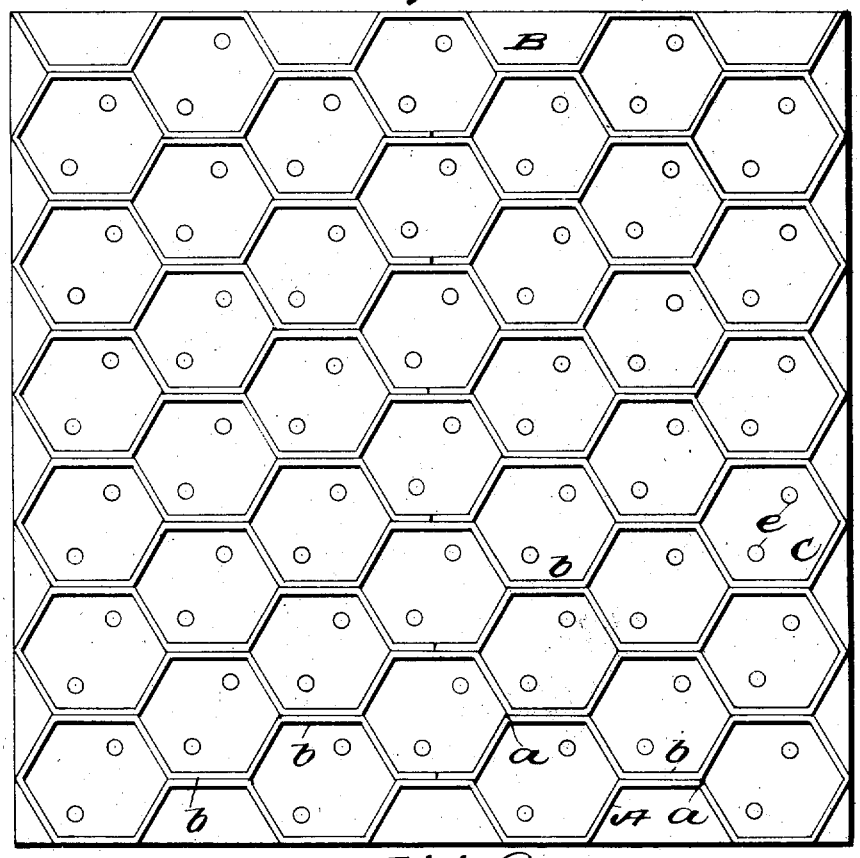

No. 11,802. Reissued Jan. 16, 1900.

C. E. LA FLEUR.

EGG CASE FILLER.

(Application filed Nov. 20, 1899.)

2 Sheets—Sheet 1.

Witnesses

Jno. Imrie

M. H. Hatkins

Inventor

Charles E. La Fleur

By Stewart & Stewart

Attorneys

No. 11,802. Reissued Jan. 16, 1900.
C. E. LA FLEUR.
EGG CASE FILLER.
(Application filed Nov. 20, 1899.)
2 Sheets—Sheet 2.
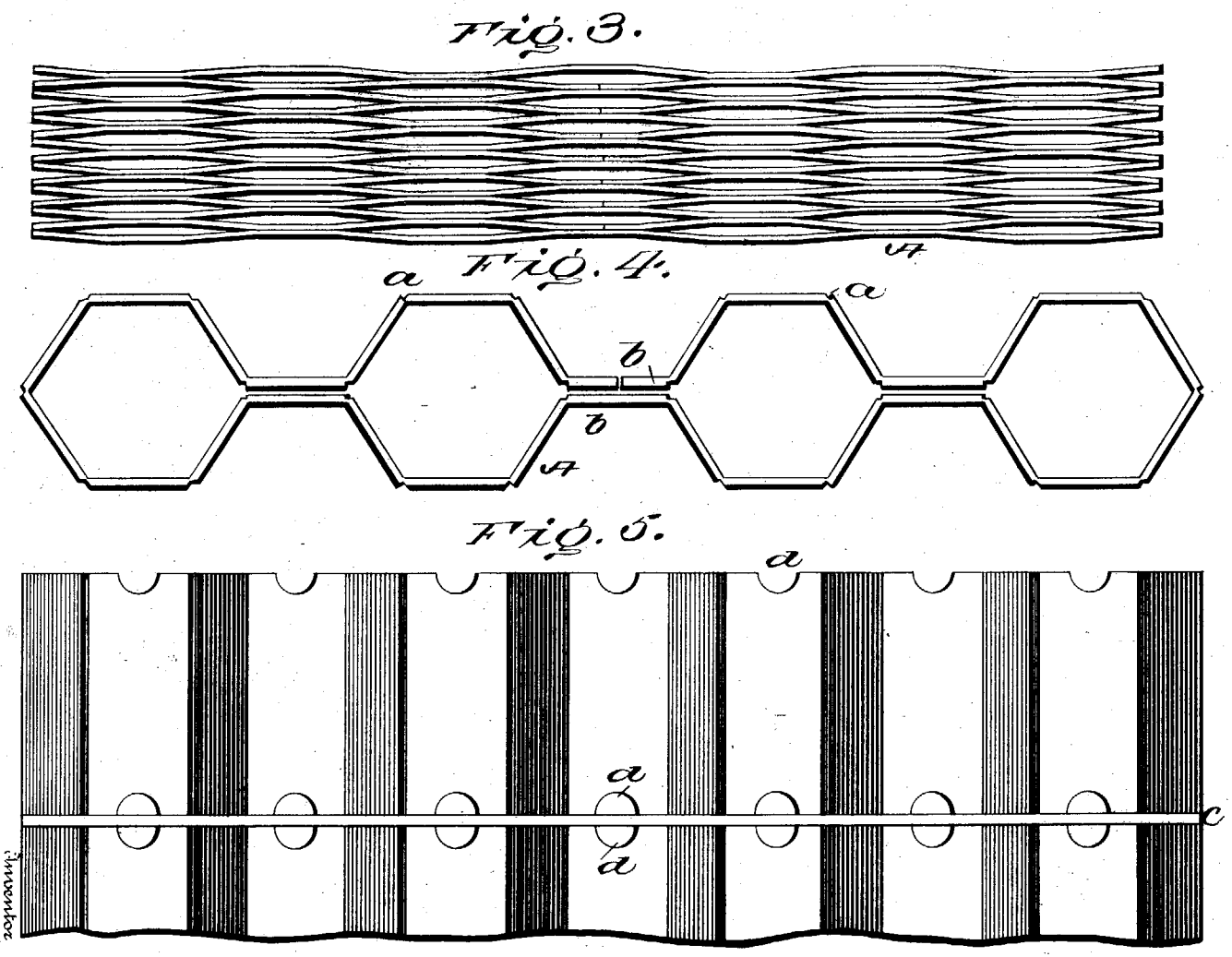
Witnesses
Jno. Ennis
Ma. H. Hatkins.
Inventor
Charles E. La Fleur
By Stewart & Stewart
Attorneys

UNITED STATES PATENT OFFICE.

CHARLES E. LA FLEUR, OF BALTIMORE, MARYLAND, ASSIGNOR TO GEORGE A. HORNER AND ARTHUR L. HORNER, OF SAME PLACE.

EGG-CASE FILLER.

SPECIFICATION forming part of Reissued Letters Patent No. 11,802, dated January 16, 1900.

Original No. 621,609, dated March 21, 1899. Application for reissue filed November 20, 1899. Serial No. 737,714.

*To all whom it may concern:*

Be it known that I, CHARLES E. LA FLEUR, of the city of Baltimore, in the State of Maryland, have invented certain Improvements in Egg-Case Fillers, of which the following is a specification.

My invention relates to an improved collapsible egg-case filler having hexagonal cells or pockets for the reception of eggs adapted to be used in connection with several others of a like character in a suitable shipping-box or packing-case.

In making an egg-case filler there are two primary objects which must be considered and accomplished. One is that the greatest number of eggs shall be gotten into a given space. The other is that the filler shall be easily and cheaply manufactured, shall be capable of shipment in a small space when not in use, and shall be capable of being put into use with the least expenditure of time and labor on the part of the egg-packer. My invention is designed to accomplish all of these objects.

I have devised a form of filler which is capable, according to the size employed, of packing in a given space from one-sixth to one-fifth more eggs than can be packed in the same space by the employment of any other form of filler known to me. I form my filler of a series of rows of hexagonal cells, and I form my cells by constructing a series of independent sections, each section consisting of a sheet or strip formed in one piece or several pieces secured together properly scored to form hexagonal cells when folded upon itself. I then fold the strip upon itself in the manner shown in Fig. 4 of the drawings and unite by gluing the first and eighth panel of every series of eight panels, or, if there be a series of cells, the total number of panels will be a multiple of eight, less one, and in that case the first panel may be glued to any other panel which is a multiple of eight, or to the end panel which is a multiple of eight less one, and then if every fourth panel from the union be united until the end is reached where the end cell will consist of six panels a series of cells will be formed, each consisting of six panels and having between each two cells two parallel panels united together. It will thus be seen that the strip of which the section is formed is folded upon itself and has its ends united together or to the body of the strip at a point intermediate of the ends. The location of this point of union may be anywhere from extreme end to extreme end—that is to say, any two panels in the whole series may overlap and be united; but no matter which two are united the union will be intermediate of the extreme ends of the section when constructed. When now a second section similar to that shown in Fig. 4 is placed beside the first section and the contacting walls of the cells of each section united, there will be formed hexagonal cells between the two sections which have been thus united. If the sections consist of four cells each, as shown in Fig. 4, the intermediate cells will be three in number, and it will be perceived that with the addition of a single cell and a connecting-panel to each section three cells will be added to the series. Thus if a section be formed having two cells and two of these sections be united the whole filler thus made will consist of five cells. If, now, one more cell be added to each of these sections, eight cells will be produced, and so on. If three sections of four cells be united together, eighteen cells will be produced. If a line be drawn through the center of each section in the direction of its length, it would be its axis. It will be seen that a series of rows of cells has been thus constructed, the number of which, at right angles to the axis of the sections, will be odd and not even. I have found that this is true of any expansion of my system, and therefore I have claimed my structure as one in which the filler consists of a series of an odd number of rows of hexagonal cells, each row of cells being at right angles to the contacting walls of the cells. Heretofore it has been attempted to produce a filler of this character by using a continuous strip of scored material and forming the filler somewhat like mine; but with this system it is impossible to make a filler in which an odd number of rows of cells are formed at right angles to the contacting walls. Such a structure will always produce a filler having an even number of rows of cells, the rows being at right angles to the contacting walls of the cells. The result is that any given space which is filled with my filler will contain a larger number of cells than can be gotten into the same space by any other system if the same sized cells be used. The prevailing egg-crate is eleven and one-half inches by eleven and one-half inches. Hens' eggs average one and three-fourths inches in diameter. By my system I can pack forty-two eggs in this space, which is more than can be packed by any other system.

In the further description of the said invention which follows reference is made to the accompanying drawings, forming a part thereof, and in which—

Figure 2:
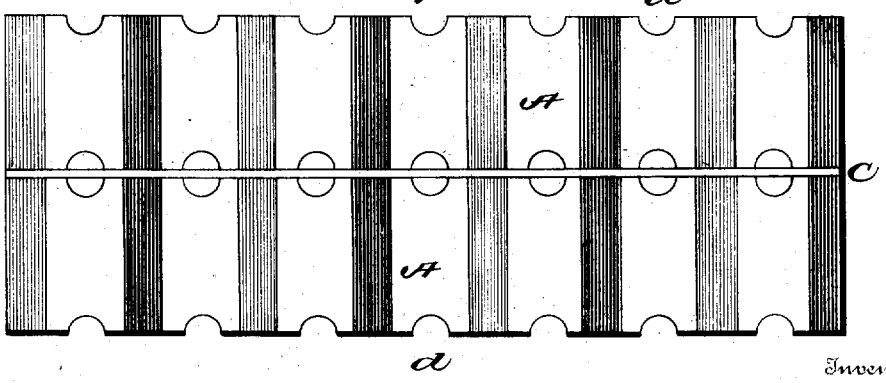

Figure 1 is a top view of the improved filler, showing the same as extended and laid upon a perforated board which separates it from a similar filler beneath. Fig. 2 is an edge view of Fig. 1. Fig. 3 is a top view of the filler as it appears when collapsed or closed for storage or transportation. Fig. 4 is an enlarged top view of a section of the filler before the two sides thereof are glued together. Fig. 5 is an edge view of Fig. 4.

In constructing a filler in accordance with my present invention I take a straw or wood pulp board A of suitable width and of a length equal to the aggregate length of the sides of, say, four hexagonal cells, and in addition twice the length of the spaces between them, and provide it with notches or incisions *a*, which extend transversely of the board and having separating distance equal to the length of the sides of the cells. These notches or incisions constitute the corners of the cells and allow of the board being bent thereat without distorting the material between them from a straight line. The board is then susceptible of being given the form shown in Figs. 1 and 4, its ends meeting at the center of the device. Other folded boards, constructed as described, are then added to the first, the adjoining faces *b* being glued together when the last is provided with a half-board B. The united boards are then clamped until the glue is dry, when they are cut into strips of a width a little greater than the length of an egg.

From the foregoing description it will be understood that each filler consists of a number (preferably six) of independent sections and a half-section glued together, each section having a continuous wall, and that the ends of the strips must meet at the center of the device, where they are glued to the opposite face.

By folding the board so that its ends will meet at the center, as described, the manufacture of the filler is much simplified and more readily constructed by machinery, for the reason that the upturned ends have a common length.

In packing eggs for shipment a filler is laid on the bottom of the case and extended and its cells filled. A perforated partition-board is then laid over the eggs and another filler added and its cells filled, this process being continued until the requisite number of fillers are in place and the case filled.

I claim as my invention—

An egg-case filler comprising a series of independent sections, each section consisting of a sheet or strip properly scored to form hexagonal cells when folded upon itself, and the proper panels united to form a series of cells with a panel between each two cells, the ends being united intermediate the ends of the section, and made collapsible to admit of its being flattened and clamped to a corresponding and similar section, the sections having the contacting panels secured together so that the filler will consist of a series of an odd number of rows of cells at right angles to the axis of the sections.

CHARLES E. LA FLEUR.

Witnesses:
W. W. POWELL,
E. R. BERKELEY.